United States Patent
Kelsey et al.

(10) Patent No.: US 9,197,510 B2
(45) Date of Patent: Nov. 24, 2015

(54) EFFICIENT NETWORK DATA DISSEMINATION

(71) Applicant: Silicon Laboratories, Inc., Austin, TX (US)

(72) Inventors: Richard Kelsey, Belmont, MA (US); Matteo Paris, Concord, MA (US)

(73) Assignee: Silicon Laboratories Inc., Austin, TX (US)

( * ) Notice: Subject to any disclaimer, the term of this patent is extended or adjusted under 35 U.S.C. 154(b) by 271 days.

(21) Appl. No.: 14/041,066

(22) Filed: Sep. 30, 2013

(65) Prior Publication Data

US 2015/0092606 A1 Apr. 2, 2015

(51) Int. Cl.
*H04L 12/24* (2006.01)
(52) U.S. Cl.
CPC ....................................... *H04L 41/12* (2013.01)
(58) Field of Classification Search
CPC ....................................................... H04L 41/12
See application file for complete search history.

(56) References Cited

U.S. PATENT DOCUMENTS

| 7,522,540 | B1 * | 4/2009 | Maufer | 370/254 |
| 2005/0063419 | A1 * | 3/2005 | Schrader et al. | 370/466 |
| 2005/0243765 | A1 * | 11/2005 | Schrader et al. | 370/328 |
| 2012/0051365 | A1 * | 3/2012 | Bahr et al. | 370/401 |
| 2014/0105097 | A1 * | 4/2014 | Liu | 370/312 |
| 2014/0269380 | A1 * | 9/2014 | Rusak et al. | 370/252 |
| 2014/0341234 | A1 * | 11/2014 | Asterjadhi et al. | 370/474 |
| 2015/0063336 | A1 * | 3/2015 | Cherian et al. | 370/338 |
| 2015/0092530 | A1 * | 4/2015 | Kelsey et al. | 370/216 |
| 2015/0092606 | A1 * | 4/2015 | Kelsey et al. | 370/255 |
| 2015/0109961 | A1 * | 4/2015 | Patil et al. | 370/254 |

* cited by examiner

*Primary Examiner* — Robert Wilson
(74) *Attorney, Agent, or Firm* — Nields, Lemack & Frame, LLC

(57) ABSTRACT

A method of efficiently disseminating various types of information throughout a mesh network is disclosed. Information is typically propagated through the network using a variety of protocols and messages. However, in one embodiment, a single message, communicates all of this information at once. The message includes data originating at the leader, which does not change as the messages are propagated through the network, as well as topology and link information that is created by the forwarding nodes. The data originating at the leader includes the identity of the leader node and a sequence number. Additionally, a version number is included by the leader which represents the state of the quasi-static information. Quasi-static information may include, for example, the identity of a node that has access to a central control system or the internet. This compact message format allows improved efficiency and use of the network.

16 Claims, 13 Drawing Sheets

| Router ID | Cost (or number of hops) | Next hop | Neighbor? |
|---|---|---|---|
| A | 0 | | |
| B | 1 | B | Y |
| C | 1 | C | Y |
| D | 2 | B | N |
| E | 2 | B | N |
| F | 3 | B | N |
| G | 2 | C | N |

| Router ID | Cost (or number of hops) | Next hop | Neighbor? |
|---|---|---|---|
| A | 0 | | |
| B | 1 | B | Y |
| C | 1 | C | Y |
| D | 2 | B | N |
| E | 2 | B | N |
| F | 3 | B | N |
| G | 2 | C | N |

FIG. 3A

| Router ID | Cost (or number of hops) | Next hop | Neighbor? |
|---|---|---|---|
| A | 2 | B | N |
| B | 1 | B | Y |
| C | 3 | B | N |
| D | 2 | B | N |
| E | 0 | | |
| F | 1 | F | Y |
| G | 4 | B | N |

FIG. 3B

| Router ID | Cost (or number of hops) | Next hop | Neighbor? |
|---|---|---|---|
| A | 0 | | |
| B | 1 | B | Y |
| C | 1 | C | Y |
| D | | | N |
| E | | | N |
| F | | | N |
| G | | | N |

FIG. 4A

| Router ID | Cost (or number of hops) | Next hop | Neighbor? |
|---|---|---|---|
| A | 0 | B | |
| B | 1 | B | Y |
| C | 1 | C | Y |
| D | 2 | B | N |
| E | 2 | B | N |
| F | | | N |
| G | | | N |

FIG. 4B

| Router ID | Cost (or number of hops) | Next hop | Neighbor? |
|---|---|---|---|
| A | 0 | | |
| B | 1 | B | Y |
| C | 1 | C | Y |
| D | 2 | B | N |
| E | 2 | B | N |
| F | | | N |
| G | 2 | C | N |

FIG. 4C

| Router ID | Cost (or number of hops) | Next hop | Neighbor? |
|---|---|---|---|
| A | 0 | | |
| B | 1 | B | Y |
| C | 1 | C | Y |
| D | 2 | B | N |
| E | 2 | B | N |
| F | 3 | B | N |
| G | 2 | C | N |

FIG. 4D

| Router ID | Cost (or number of hops) | Next hop | Neighbor? |
|---|---|---|---|
| A | 1 | A | Y |
| B | 0 | | |
| C | | | N |
| D | 1 | D | Y |
| E | 1 | E | Y |
| F | | | N |
| G | | | N |

FIG. 5A

| Router ID | Cost (or number of hops) | Next hop | Neighbor? |
|---|---|---|---|
| A | 1 | A | Y |
| B | 0 | | |
| C | 2 | A | N |
| D | 1 | D | Y |
| E | 1 | E | Y |
| F | | | N |
| G | | | N |

FIG. 5B

| Router ID | Cost (or number of hops) | Next hop | Neighbor? |
|---|---|---|---|
| A | 1 | A | Y |
| B | 0 | | |
| C | 2 | A | N |
| D | 1 | D | Y |
| E | 1 | E | Y |
| F | 2 | E | N |
| G | | | N |

FIG. 5C

| Router ID | Cost (or number of hops) | Next hop | Neighbor? |
|---|---|---|---|
| A | | | N |
| B | 1 | B | Y |
| C | | | N |
| D | | | N |
| E | 0 | | N |
| F | 1 | F | Y |
| G | | | N |

FIG. 6A

| Router ID | Cost (or number of hops) | Next hop | Neighbor? |
|---|---|---|---|
| A | 2 | B | N |
| B | 1 | B | Y |
| C | 3 | B | N |
| D | 2 | B | N |
| E | 0 | | N |
| F | 1 | F | Y |
| G | | | N |

FIG. 6B

| Router ID | Cost (or number of hops) | Next hop | Neighbor? |
|---|---|---|---|
| A | 3 | E | N |
| B | 2 | E | N |
| C | 4 | E | N |
| D | 1 | D | Y |
| E | 1 | E | Y |
| F | 0 | | |
| G | | | N |

FIG. 7

| Router ID | Cost (or number of hops) | Next hop | Neighbor? |
|---|---|---|---|
| A | 1 | A | Y |
| B | | | N |
| C | 0 | | |
| D | | | N |
| E | | | N |
| F | | | N |
| G | 1 | G | Y |

FIG. 8A

| Router ID | Cost (or number of hops) | Next hop | Neighbor? |
|---|---|---|---|
| A | 1 | A | Y |
| B | 2 | A | N |
| C | | | |
| D | | | N |
| E | | | N |
| F | | | N |
| G | 1 | G | Y |

FIG. 8B

| Router ID | Cost (or number of hops) | Next hop | Neighbor? |
|---|---|---|---|
| A | 1 | A | Y |
| B | 2 | A | N |
| C | 0 | | |
| D | 3 | A | N |
| E | 3 | A | N |
| F | | | N |
| G | 1 | G | Y |

FIG. 8C

| Router ID | Suffix |

| Leader Node | Sequence Number | Quasi-Static Information Version Number | Router A Information | Router B Information | Router C Information | Router D Information | Router E Information | Router F Information | Router G Information |
|---|---|---|---|---|---|---|---|---|---|
| | | | | | | | | | |

FIG. 11

EFFICIENT NETWORK DATA DISSEMINATION

This disclosure describes methods of efficiently disseminating routing, neighbor and other information throughout a mesh network.

BACKGROUND

Mesh networks are a type of network which nodes often have several functions. In addition to their primary function as a sensor, actuator, of other device, these nodes may also serve as routers, helping move traffic between two other nodes in the network. Mesh networks can grow quite large, often having over 100, or in some case over 1000 nodes, most of which are also routers.

While mesh networks tend to be robust, since there are often multiple paths between any two nodes, there are drawbacks as well. For example, with such a large number of nodes, it becomes impractical for each node to know the most efficient path to every other node in the network. Consequently, these mesh networks often utilize one or more route discovery protocols. Regardless of the protocol used, information concerning the topology of the network must be disseminated throughout the network. Depending on the number of routers in the mesh network, the amount of information required to fully describe the network topology may be very large.

It is also necessary to maintain information on the properties of individual links, both inherent, such as reliability, and protocol-dependent, such as initalization status. This requires that additional information be shared between nodes and stored on each of these nodes. This normally entails the use of a separate protocol and additional messages.

In addition, network information, such as the location of specific services, and other data, needs to be shared throughout the mesh network. Currently, all of this information is disseminated using different protocols, each using its own messages and data formats. All of these messages and protocols create network traffic, which consumes valuable bandwidth.

Therefore, it would be beneficial if there was a different method of disseminating information throughout a mesh network such that all routers were aware of all of the information related to that mesh network. Such a method would minimize the number of route discovery messages and other overhead traffic that currently travels on the mesh network.

SUMMARY

A method of efficiently disseminating various types of information throughout a mesh network is disclosed. Information is typically propagated through the network using a variety of protocols and messages. However, in one embodiment, a single message communicates all of this information at once. The message includes data originating at the leader, which does not change as the messages are propagated through the network, as well as topology and link information that is created by the forwarding nodes. The data originating at the leader includes the identity of the leader node and a sequence number. Additionally, a version number is included by the leader which represents the state of the quasi-static information. Quasi-static information may include, for example, the identity of a node that has access to a central control system or the internet. This compact message format allows improved efficiency and use of the network.

According to one embodiment, a method of disseminating information throughout a mesh network is disclosed. The mesh network comprises a plurality of nodes and a leader node which maintains a list of routers. The method comprises creating a beacon message at the leader node, the beacon message comprising: an identity of the leader node; a sequence number; a version number associated with quasi-static network information; a first network topology portion, the first network topology portion comprising entries for each of the routers in the network, a cost of reaching each of the routers from the leader node, and a next hop to be used when communicating from the leader node with each of the routers; and first link information indicating link quality and protocol state of each of the routers that is a neighbor of the leader node; transmitting the beacon message from the leader node; receiving the beacon message by a first router disposed within a listening range of the leader node; creating a first routing table in a memory device within the first router using the first network topology and first link information from the received beacon message, and using link information learned about neighbors of the first router; transmitting a second beacon message from the first router, the second beacon message comprising: the identity of the leader node; the sequence number; the version number associated with quasi-static network information; a second network topology portion; and second link information; wherein information from the first routing table is incorporated in the second network topology portion and the second link information.

According to a second embodiment, a method of disseminating information in a mesh network comprising a plurality of routers is disclosed. The method comprises: transmitting from a first router, a single beacon message, the beacon message comprising: a sequence number; a version number associated with quasi-static network information; a first network topology portion, the first network topology portion comprising entries for each of the routers in the network, a cost of reaching each of the routers from the first router, and a next hop to be used when communicating from the first router with each of the routers; and first link information indicating link quality and protocol state of each of the routers that is a neighbor of the first router. In a further embodiment, the method further comprises receiving at a second router, the beacon message from the first router; and updating, in a memory located within the second router, a routing table, the routing table having entries comprising a cost of reaching each of the routers from the second router, a next hop to be used when communicating from the second router with each of the routers, based on the received beacon message.

BRIEF DESCRIPTION OF THE DRAWINGS

For a better understanding of the present disclosure, reference is made to the accompanying drawings, in which like elements are referenced with like numerals, and in which:

FIGS. 3A-3B show routing tables for two of the routers in FIG. 2;

FIGS. 4A-4D show the routing table for the leader node during the dissemination process;

FIGS. 5A-5C show the routing table for Node B during the dissemination process;

FIGS. 6A-6B show the routing table for Node E during the disseimination process;

FIG. 7 shows the routing table for Node F during the dissemination process;

FIGS. 8A-8C show the routing table for Node C during the dissemination process;

FIG. 11 shows one representation of the format of a compact beacon message.

DETAILED DESCRIPTION

Figure 1:
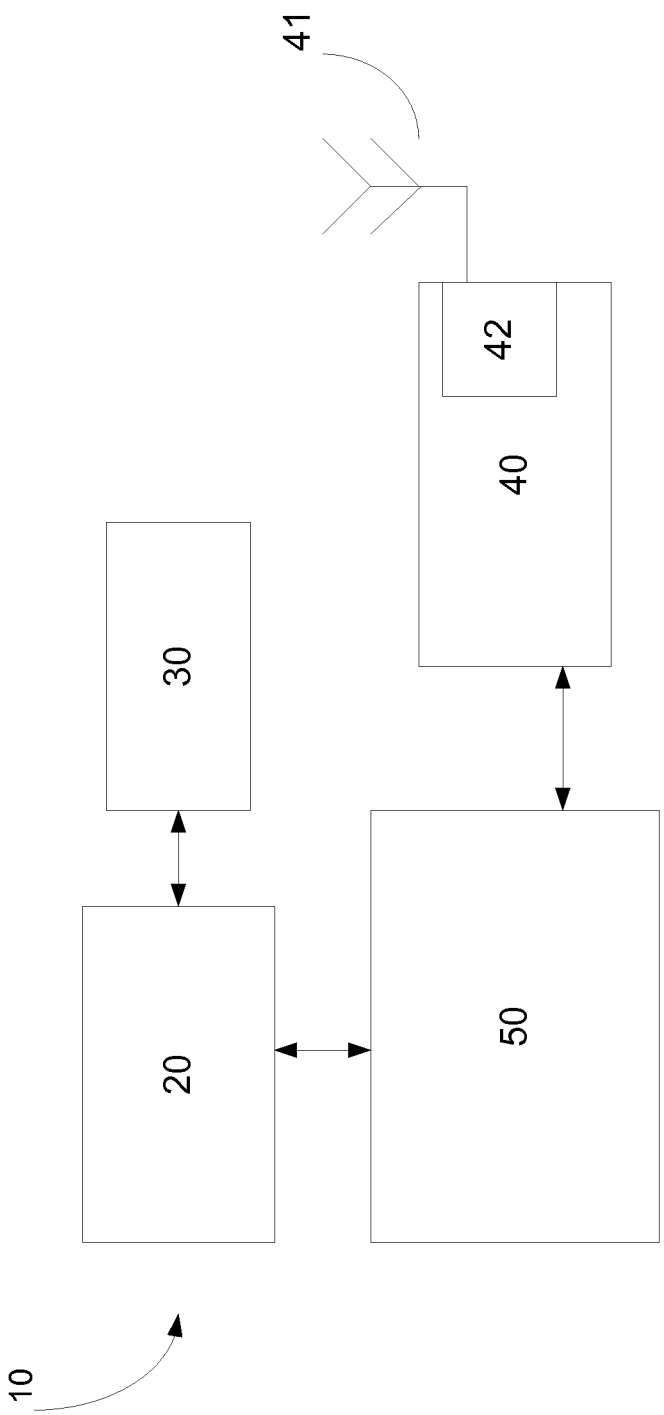
FIG. 1 is a block diagram of a node in a mesh network.

Devices that are used in mesh networks are typically small, often battery powered. FIG. 1 shows a block diagram of a representative device 10. The device 10 has a processing unit 20 and an associated memory device 30. This memory device 30 contains the instruction, which, when executed by the processing unit, enable the device 10 to perform the functions described herein. This memory device 30 may be a non-volatile memory, such as a FLASH ROM, an electrically erasable ROM or other suitable devices. In other embodiments, the memory device 30 may be a volatile memory, such as a RAM or DRAM. The device also includes a network interface 40, which is typically a wireless interface including an antenna 41. Additionally, the network interface may comprise a radio 42, which includes the baseband processing and MAC level processing. The device 10 may include a second memory device 50 in which data that is received by the network interface 40, and data that is to be transmitted by the network interface 40, is stored. This second memory device 50 is traditionally a volatile memory. The processing unit 20 has the ability to read and write the second memory device 50 so as to communicate with the other nodes in the network. Although not shown, each device 10 also has a power supply, which may be a battery or a connection to a permanent power source, such as a wall outlet.

The present disclosure describes the use of a compact message format to disseminate all of the information associated with the mesh network to all of the routers in that mesh network. This information includes routing information, status of neighbors, location and availability of specialized services, and other data. In addition, the compact message format also includes information provided by the leader node of the network, such as its identity and a sequence number. The leader node maintains the state of slowly changing data that pertains to the network, as described in more detail below. A version number associated with this slowly changing data is also included in the compact message format. This compact message format allows efficient dissemination of network information through the mesh network. This compact message format is made possible by limiting the number of routers in the mesh network.

The compact message format includes:
the identity of the leader node;
a keep alive value or sequence number;
the version number of the slow changing data;
information about the cost and initialization state of links to neighbors (i.e. link information); and
the path cost and next hop to each router.

The first three elements of the format originate with the leader and may be referred to as the leader information. The last two elements originate with the node that transmits the beacon. The last element of the format may be referred to as network topology information. In some embodiments, all of these fields may not be part of the compact message format.

A beacon message, utilizing this compact message format, is sent by all routers in the mesh network. The leader node is defined as the node that maintains the list of routers and also maintains all of the slow changing data. All routers in the network transmit a beacon, incorporating their own link information and network topology in the beacon message, while maintaining the leader information. The identity of the leader node is included in the beacon message in the event that network defragmentation occurs. Network defragmentation is outside of the scope of this disclosure and is not described herein.

To help track all of the beacon messages, a sequence number or some other indicia may be incorporated in the beacon message. In one embodiment, the leader node defines the sequence number used for a beacon message. As this beacon message is disseminated throughout the networks, the other routers maintain the sequence number assigned by the leader node. In this way, all routers in the network are able to keep track of these beacon messages. For example, a router may receive a beacon message with a certain sequence number. If it has not yet received a beacon message with this sequence number, it will send out its own beacon message using this sequence number. However, if it receives another beacon message with this sequence number after it has already transmitted its own beacon message, it will update its routing table based on this newly received beacon message, but will not use any of the leader information.

It is important to note that, in some embodiments, routers transmit a new beacon message having a particular sequence number after having received at least one beacon message with that sequence number. However, other embodiments are also possible. For example, each node may generate its own beacon messages based on elapsed time since its last transmission, regardless of whether it has received any new beacon messages during that time interval. In this embodiment, the node may transmit the highest sequence number that it has received in a beacon message.

In addition, the keep alive value or sequence number may be used by the other nodes in the network to allow them to verify that they remain connected to the mesh network associated with the leader node. A missing sequence number or non-sequential sequence number may indicate that a node is not receiving all beacon messages from the leader node.

A mesh network may also have certain information that changes very infrequently, also referred to as slow changing data, or quasi-static information. For example, the identity of a node that has access to a central control system or the internet may be needed by all of the nodes in the mesh network. However, this information is likely to be relatively static, or is likely to change very infrequently. Therefore, it is not efficient to continuously broadcast this quasi-static information throughout the mesh network. As an alternative, the compact message format includes a version number of the quasi-static data. This version number comprises the most recent state of this quasi-static information. The nodes that receive the beacon may compare the quasi-static version number contained in the beacon to a saved value saved in the storage element of the node. If the version numbers match, then the node has the latest state of the quasi-static data. However, if the version numbers differ, the node may request the latest quasi-static data from the node that sent the beacon containing the new version number. In this way, traffic is only generated at those times when the quasi-static data changes, as this information is not propagated regularly.

Information associated with network topology and link information is also included in the compact message format. Link information is defined as information that concerns the quality and protocol state of a link between two nodes. Each time a message is received from a neighbor, the receiving node notes the signal strength of that transmission. It also notes whether the link is secured. The receiving node performs these functions for transmissions from each of its neighbors. Thus, each node is able to ascertain and maintain link information, which comprises the signal strength and protocol status of its connections with each of its neighbors. This link information is saved within the memory 30 located in that node.

This link information may be asymmetric in that the two nodes that define a link may have different values associated with that link. For example, one node may sense a first signal strength for received transmissions from a second node. The second node may sense a second signal strength, which may be different than the first signal strength. Each node incorporates its stored link information in beacon messages that it transmits. To fully describe a link, information from both nodes that define that link are required.

As described above, one of the issues associated with mesh networks is the amount of overhead traffic generated by, in particular, route discovery messages. One way to address this issue is to have each router maintain a complete table showing the topology of the network and all of the preferred routes through that network. For example, the routing table maintained by each router may include the router ID of every router in the mesh network, its cost to each of those other routers, the next hop when this router sends a message to that router, whether that router is a neighbor and link information about the cost and initialization state of links to each of its neighbors, as defined above. A neighbor is defined as a node that can be reached directly by another node.

This routing table may include link information and network topology information in a single data structure. These two different types of information are typically disseminated throughout the network using two different protocols with different message types. Thus, as used in this disclosure, the term "routing table" refers to one or more structures in memory which are used to maintain both network topology and link information and is not limited to only network topology information. Of course, this information may be partitioned into several structures in memory, and the disclosure includes such embodiments. For example, network topology information may be stored in a first data structure and link information may be stored in a separate data structure. However, for purposes of this disclosure, the term "routing table" encompasses all such embodiments.

The inclusion of this routing table in the compact message format, which is included in every beacon message, significantly reduces the overall network traffic and insures that all nodes have a consistent view of the network.

The use of a beacon message utilizing the compact message format described above may be used to create and disseminate this routing table to all routers in the mesh network.

Figure 2:
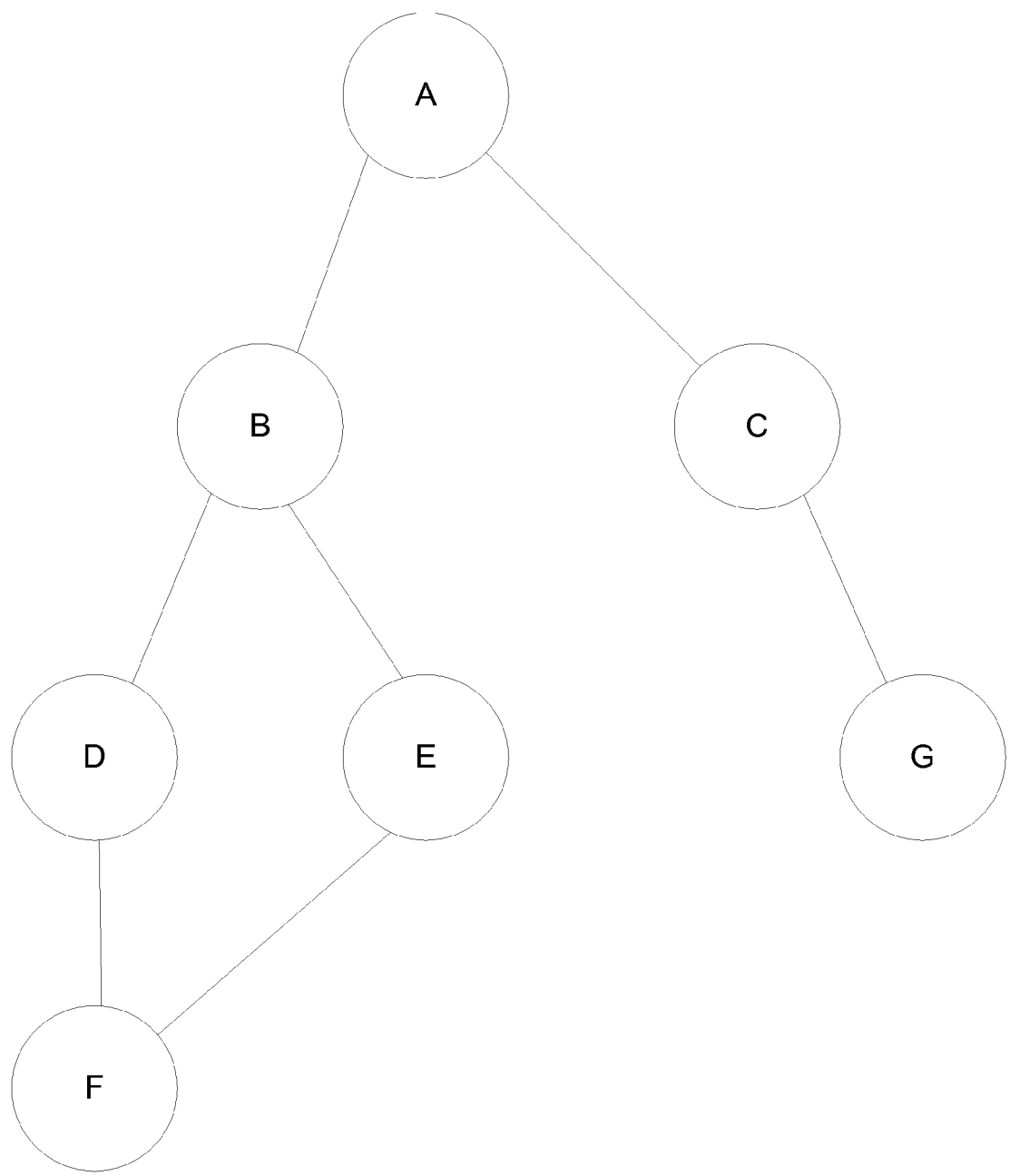
FIG. 2 is an exemplary network topology.

Assume the network topology of FIG. 2, where Node A is the leader node and all nodes shown are assumed to be routers. In this scenario, Node A would maintain a routing table as shown in FIG. 3A. Node A would also maintain link information about Nodes B and C, although not shown in FIG. 3A. To reach Node B (which is directly reachable), Node A has a cost of 1 (indicating it is one hop away), and the next hop when sending to that node is Node B. Finally, Node A indicates that Node B is a neighbor. A similar entry exists in the routing table of Node A for each other router in the network, namely Nodes C-G. In this way, Node A maintains a complete view of the mesh network, as well as the preferred routing path to every other router in that network. Similar routing tables are created in each of Nodes B-G. For comparison, the routing table for Node E is shown in FIG. 3B. Note that each routing table is unique, due to that router's placement in the network.

By maintaining a routing table which fully describes the network topology, route discovery is not necessary each time a router wishes to send a message. Assume that Node F wishes to send a message to Node G. Node F refers to its routing table and identifies Node E as the next hop when communicating with Node G. It therefore sends its message, which is destined for Node G, to Node E. Node E, upon receiving this message, consults its routing table and determines that the next hop when communicating with Node G is Node B. It then forwards the message to Node B. Node B repeats this sequence, sending the message to Node A, which sends it to Node C, which ultimately delivering it to Node G. Note that, in this embodiment, each node knew exactly how to handle this message without any routing information being explicitly contained in the header of the message.

However, a protocol is needed to order to allow each router to create and maintain its own accurate routing table. One such method of disseminating this information is through the use of beacons. As described above, a beacon is a message sent periodically by each router in the network, which contains certain information about the network. This beacon is received by all those routers within the listening range of the transmitting node. They compare their currently stored information to that received by the transmitting node. Based on this comparison, they updated their routing tables. At a later time, these nodes broadcast a beacon message with the updated routing table to their neighbors. In creating the beacon message, these nodes will retain certain information which originated from the leader node, such as the leader information (i.e. the identity of the leader node, the sequence number and the version number of the quasi-static data). They will each create an updated routing table based on their location within the mesh network. They will each create link information based on communications with their neighbors.

This process can be repeated at regular intervals, such as every 30 seconds. It also can be variably timed based on the expected or detected variations in the network topology or routing so the beacons are reactive to network changes. In one particular embodiment, the leader node transmits the beacon message, which includes the leader information, its routing table and link information, to its neighboring routers. This routing table may include the fields shown in FIG. 3A. In this embodiment, the routing table and all its information is specific to the router transmitting the beacon. In this embodiment, for clarity and ease of understanding, it is assumed that each node transmits its beacon after having received a beacon from a node that is positioned closer to the leader node (Node A) than it is. However, as described above, in some embodiments, each router independently transmits beacon message, regardless of whether it has received a beacon message. In other words, while this disclosure describes an embodiment, where each router creates and transmits a beacon message after having received one, other embodiments are indeed possible.

When the network is originally initialized, each router's routing table is unpopulated. Thus, it must generate this routing table based only on the routing information received in the beacon messages. For example, when the process begins, Node A may recognize, using other types of messages, such as one hop neighbor discovery messages used during joining, that Node B and Node C are neighbors. It therefore, populates the routing table for these two Nodes B, C as shown in FIG. 4A. However, it has no information concerning how to reach the other routers in the network. Therefore, the information pertaining to these other routers is blank. An unpopulated field may be represented by an entry in the routing table without a cost. Nodes B and C both receive a beacon message from Node A, which includes only the information shown in FIG. 4A. These nodes then incorporate this new information with already resident routing information. For example, Node B may already know that Node A, Node D and Node E are all neighbors, as shown in FIG. 5A. It now adds a path to Node C to its routing table, based on information that it received from the beacon received from Node A. This updated routing table for Node B is shown in FIG. 5B. Node B transmits its routing table as a beacon message to all those that are within listening distance. Thus, Nodes A and E both receive this beacon. Node A is able to update its routing table with new information about Node D and Node E. The new routing table for Node A now appears in FIG. 4B. Node E, which already had determined that Nodes B and F were neighbors (as shown in FIG. 6A), now adds information about Node D, A and C based on this beacon message. The updated routing table for Node E is shown in FIG. 6B. Node E now transmits its routing table to its neighbors. Based on this transmission, Node F receives the routing table of Node E. It then creates its own routing table, based on this beacon, as shown in FIG. 7.

Note that Node E transmitted a routing table to Node F which indicated that Node D was 2 hops away, using Node B (see FIG. 6B). However, Node F has direct connectivity with Node D. Therefore, rather than accept Node E's information concerning Node D, it uses its own information, as this provides a lower cost path to Node D. This comparison and selection of the best path based on all of the received beacons is performed each time a beacon is received. Therefore, a particular node, like Node E may receive a beacon message from Node B, indicating that the path to Node D is through Node B. Node E will also receive a beacon message from Node F, indicating that the path to Node D is through Node F. Node E will then select one of these routes based on total cost.

At the same time, Node B receives the beacon message from Node E and updates its routing table to include Node F, as shown in FIG. 5C.

While the beacon messages were being propagated through the left branch of the network, beacon messages were likewise being propagated on the right side of the network. Specifically, Node C, which was aware of its neighbors, Nodes A and G, as shown in FIG. 8A, receives information about Node B from Node A during the initial beacon message transmitted by Node A. Node C then updates its routing table to include this new information, as shown in FIG. 8B. Node C then broadcasts its updated routing table, which is received by Node A and Node G. Node A then updates its routing table to include new information about Node G, as shown in FIG. 4C.

Based on the propagation of a single beacon message from each router, each router in the mesh network now has some information about the overall network topology and link information. Note that, at this time, no node actually has a completely accurate routing table. Sometime later a second beacon message is sent by the leader node, Node A. Based on the beacons that it received from Node B and Node C, it had updated information about all nodes that are 2 hops away from it (i.e. Nodes D, E and G), but no information about nodes that are farther away (i.e. Node F), as shown in FIG. 4C. Node B and C receive this updated beacon message and update their routing tables according. Node B is now aware of Node G and its updated routing table, shown in FIG. 5D. Similarly, Node C updates its routing table as shown in FIG. 8C.

Node C propagates its routing table to Node G and A. Since Node C does not have any information not already known by Node A, the routing table of Node A is not changed. Node B also transmits its updated routing table to Nodes A, D and E. Since Node B now is aware of Node F, that information is now included in the routing table of Node A, as shown in FIG. 4D. Note that, after Node A receives this second beacon from Node B, it is fully aware of the topology of the mesh network. Therefore, its next beacon will constitute a complete network topology. Of course, this example was specific to the network topology of FIG. 2. The number of beacon messages required before the correct topology is being disseminated is based on the distance from the leader node (i.e. Node A) to the most distant node in the mesh network.

In this embodiment, the maximum number of routers may be limited to the amount of information that can be transmitted in a single beacon message. For example, a beacon message may be 128 bytes in length due to constraints in the radio or requirements on allowed power consumption when sending a message. Thus, is the amount of information stored in the routing tables for each router was 4 bytes, the network could only have a maximum of 128/4 or 32 routers. However, in some embodiments, it may be possible to reduce the amount of information stored, or at least transmitted about each router. For example, if the entire routing table is transmitted in the beacon message, it may not be necessary to explicitly include the routers' identities. In other words, the first field refers implicitly to Router 1, the second field refers implicitly to Router 2, etc. In this way, valuable bytes may be saved, thereby expanding the number of routers that can exist in the network. For example, if only 3 bytes are needs for each line of the routing table, a total of 128/3 or 42 routers may be present in the network. This number of possible routers obviously expands if the fields associated with each router in the routing tables can be further reduced. Thus, in one embodiment, specific fields or locations within the compact message are designated as pertaining to a particular router. FIG. 11 shows one embodiment of the compact message format. The message may contain the leader information, such as the leader node identification, the sequence number and the quasi-static information version number. Following the leader information is the network topology and link information. As shown in FIG. 11, each field in the message is designated as containing the information associated with a particular router. In this way, valuable bytes in the message are not consumed by identifying each router.

Thus, in one embodiment, shown in FIG. 11, the network topology and link information portions of the beacon message comprises information about the cost to a particular router, the next hop in transmitting to that router, whether that router is a neighbor, and the link information, without identifying that router explicitly. Specifically, the identity of the router is implied by the position of its fields within the beacon message.

In some embodiments, the link information is included as a field in the router information (see FIG. 11). In this embodiment, link information for nodes that are not neighbors of the node sending the beacon is left blank. Thus, in the case of the network illustrated in FIG. 2, a beacon message transmitted by Node B would populate the link fields associated with Nodes A, D and E, while leaving all other link fields blank. Of course, other encoding techniques may also be used.

This beacon mechanism is also able to identify and update the routers regarding any changes to the network topology. Suppose that the preferred path to Node F utilized Router D. Note that there is another path to Node F (through Node E), which is not currently used to any of the routers (except Node E). If Node D were to fail or be removed from the network, the path between most routers and Node F would be severed. As the beacon messages were propagated through the network, Node B would identify that Node D is no longer a neighbor. This information would be transmitted to Node B, which then would be required to use the routing information from Node E to reach Node F. During its next beacon message, Node B would make this information known to Node A. During a subsequent beacon, Node A would then disseminate this updated routing information throughout the entire network.

A similar mechanism would occur if a new, shorter path to a node became available. As information about this node was discovered first by its neighbors, it would then be disseminated as described above.

The above mechanism describes a method whereby the network topology of all of the routers in a mesh network is discovered and disseminated throughout the network. As described above, in one embodiment, a single beacon message includes all of the information concerning every router in the network. Of course, multiple beacon messages can be used to disseminate this topology information. However, in this embodiment, it is likely that more identifying information may need to be transmitted so that each receiving node understands which set of routers are being described in this beacon message. For example, the beacon message may include a field which identifies the first router being described by this message. In another embodiment, the beacon message may include a field to explicitly identify the router identity in each entry in the routing tables. Of course, other methods are possible to insure that the receiving nodes properly identify the entries in the routing table contained in a particular beacon message. However, these methods require longer messages, increasing the likelihood that nodes do not have complete data on the network topology, and also require substantially more power consumption to transmit the messages.

In these embodiments, each router had been given a unique identifier. These may be a multi-bit field, such as numbers from 1 to 63 (for a six bit field). Furthermore, the dissemination of routing tables, as described above, explains how it is possible to send a message from any router in the network to any other router in that network. However, a protocol is also needed to identify each non-routing node in the network, as well as to identify the path that is to be used to reach that non-routing node.

Figures 9, 10:
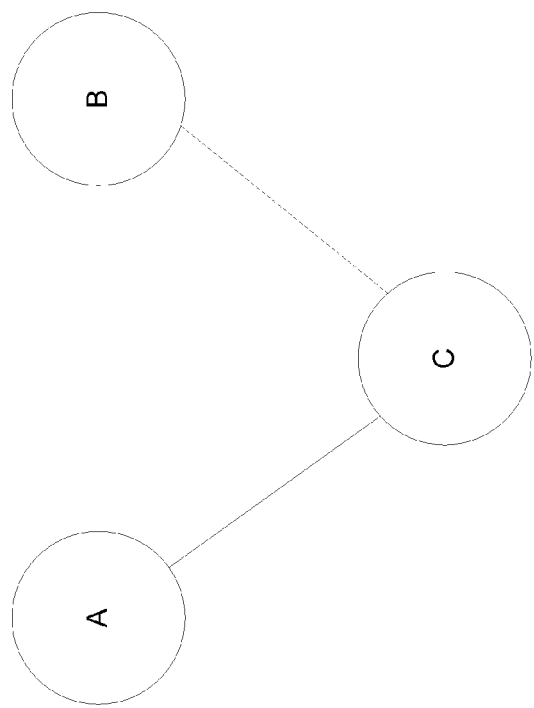
FIG. 9 shows a representation of a node according to one embodiment.
FIG. 10 shows a non-routing node within the listening range of two routers.

According to one embodiment, non-routing nodes are given node identifiers that include the router through which they are connected to the network. For example, FIG. 9 shows a possible identification field. A first number of bits are referred to as the router identification field (or routing ID), and a second set of bits are referred to as the suffix. For a router, the Router ID field contains its unique router number. The suffix may be filled with all zeroes. FIG. 10 shows a network topology having two routing nodes, Node A and Node B, and a non-routing node, Node C. Node A may have a Router ID of 01101, while Node B has a Router ID or 10001. Node C may be connected to the network through Node A. therefore, its network identification number may be 011010001, where 01101 is the Router ID of Node A, and 0001 is the suffix assigned to Node C.

In this way, routers (and other non-routing nodes) in the mesh network do not need to retain any information about Node C. rather, these transmitting nodes simply send their communication as if it were destined for Node A. The routing tables contained within each router allow the communication to arrive at Node A. Node A then looks at the suffix, determined which non-routing node this communication is for, and forwards the communication to Node C.

This linkage of non-routing devices to the router that is used to connect them to the mesh networks allows networks with potentially hundreds of nodes. As long as the number of routers is kept to a reasonable size (i.e. so that all of the routing information can be sent in a single beacon message), the number of total nodes is irrelevant.

One consequence of this scheme is that each non-routing node's identification is intimately tied to the router to which it is connected. In the embodiment of FIG. 10, assume Node A were to become unavailable or off-line. Node B, which is also within listening range of Node C, would detect that Node C can no longer communicate with the rest of the network. Node B may then offer to serve as the router for Node C. If Node A is no longer a viable option, Node C may accept Node B's request and connect to the mesh using Node B. However, in this case, Node C's previous ID, which included Node A, is no longer valid. It is no longer possible to reach Node C by sending a communication to Node A. Thus, Node C receives a new identification, such as Ser. No. 10/001,0011, where 10001 is the Router ID of Node B, and 0011 is its suffix.

Other nodes in the network may become aware of Node C's new address in a number of ways. For example, in one embodiment, Node C may generate a "Change of Address" message which is send to all nodes that it has previously communicated with, informing them of its new address. In another embodiment, Node C may send a broadcast message so all devices in the network know of its new address. However, a broadcast message uses more network bandwidth.

In addition to allowing the communication of the network topology efficiently, beacon messages also allow for nodes to know the link information for each of their links. As an example, Node B collects link information, based on signal strength and other parameters, for its connections to Nodes A, D and E (see FIG. 2). Similarly, Node D collects link information about Nodes B and F. By exchanging beacon messages, Node B now has the link information, as collected by Node D, of its shared link. In prior art systems, this information is shared using a completely different protocol and set of messages. Thus, the use of a beacon message eliminates these separate link messages. In addition, by sharing beacon messages that contain link information, Node B now has access to all of the link information regarding all of its neighbors. In addition, it also has some information regarding the other links that its neighbors have. In other words, Node B has full visibility to its links with Nodes A, D and E. In addition, it also has link information, as interpreted by Node D and Node E, of their respective links with Node F. Similarly, it also has some link information concerning Node A's link to Node C.

Thus, the beacon message utilizes a compact message format that combines information that is traditionally disseminates using different protocols and messages. Specifically, the compact message format includes the identity of the leader node, a sequence number, the version number of quasi-static information, the link information and a network topology portion that describes the mesh network.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of disseminating information throughout a mesh network, said mesh network comprising a plurality of nodes and a leader node which maintains a list of routers, said method comprising:
   creating a beacon message at said leader node, said beacon message comprising:
      an identity of said leader node;
      a sequence number;
      a version number associated with quasi-static network information;
      a first network topology portion, said first network topology portion comprising entries for each of said routers in said network, a cost of reaching each of said routers from said leader node, and a next hop to be used when communicating from said leader node with each of said routers; and
      first link information indicating link quality and protocol state of each of said routers that is a neighbor of said leader node;
   transmitting said beacon message from said leader node;
   receiving said beacon message by a first router disposed within a listening range of said leader node;
   creating a first routing table in a memory device within said first router using said first network topology and first link information from said received beacon message, and using link information learned about neighbors of said first router;
   transmitting a second beacon message from said first router, said second beacon message comprising:
      said identity of said leader node;
      said sequence number;
      said version number associated with quasi-static network information;
      a second network topology portion; and
      second link information; wherein information from said first routing table is incorporated in said second network topology portion and said second link information.

2. The method of claim 1, wherein said beacon message comprises a single message.

3. The method of claim 1, wherein an identity of each router is determined implicitly based on a location within said beacon message.

4. The method of claim 1, further comprising:
   receiving a beacon message with said sequence number at a router after said router has already transmitted a beacon message with said sequence number; and
   updating a routing table located in said router without transmitting a second beacon message with said sequence number.

5. The method of claim 1, further comprising:
   receiving a beacon message with said sequence number at said leader node after said leader node has already transmitted a beacon message with said sequence number;
   updating a routing table in a memory located in said leader node, without transmitting a second beacon message with said sequence number; and
   sending a beacon message from said leader node with information from said updated routing table using a sequence number different than said sequence number.

6. The method of claim 1, wherein said quasi-static network information comprises information related to services available within said mesh network.

7. The method of claim 1, further comprising:
   receiving a beacon message with said version number at a router;
   comparing said received version number to a previously stored version number; and
   requesting said quasi-static network information from the node from which said beacon was sent if said received version number differs from said stored version number; and
   storing said received version number.

8. A method of disseminating information in a mesh network comprising a plurality of routers, comprising:
   transmitting from a first router, a single beacon message, said beacon message comprising:
      a sequence number;
      a version number associated with quasi-static network information;
      a first network topology portion, said first network topology portion comprising entries for each of said routers in said network, a cost of reaching each of said routers from said first router, and a next hop to be used when communicating from said first router with each of said routers; and
      first link information indicating link quality and protocol state of each of said routers that is a neighbor of said first router.

9. The method of claim 8, wherein said quasi-static network information comprises information related to services available within said mesh network.

10. The method of claim 8, further comprising:
    receiving at a second router, said beacon message from said first router; and
    updating, in a memory located within said second router, a routing table, said routing table having entries comprising a cost of reaching each of said routers from said second router, a next hop to be used when communicating from said second router with each of said routers, based on said received beacon message.

11. The method of claim 10, further comprising:
    creating, at said second router, a second beacon message, said second beacon message comprising:
       said sequence number;
       said version number associated with quasi-static network information;
       a second network topology portion, said updated network topology portion comprising entries for each of said routers in said network, a cost of reaching each of said routers from said second router, and a next hop to be used when communicating from said second router with each of said routers; and
       second link information indicating link quality and protocol state of each of said routers that is a neighbor of said second router.

12. The method of claim 11, wherein said second network topology portion is created based on said routing table.

13. The method of claim 11, wherein said second link information is created based on communications between said second router and each of said routers that is a neighbor of said second router.

14. The method of claim 8, further comprising saving in a memory located within said second router, said received sequence number if said received sequence number is greater than one previously stored in said memory.

15. The method of claim 8, wherein an identity of each router is determined implicitly based on a location within said beacon message.

16. The method of claim 8, wherein said first link information is created based on communications between said first router and each of said routers that is a neighbor of said first router.

\* \* \* \* \*